United States Patent [19]

Buchanan et al.

[11] 4,097,143

[45] Jun. 27, 1978

[54] STEP-AND-REPEAT CAMERA

[75] Inventors: Vernon G. Buchanan, Salt Lake City; Carl E. Rhoades, Lindon, both of Utah

[73] Assignee: Microfilm Service Corporation, Salt Lake City, Utah

[21] Appl. No.: 750,007

[22] Filed: Dec. 13, 1976

[51] Int. Cl.² .............. G03B 27/42; G03B 27/60; G03B 27/62

[52] U.S. Cl. ............................ 355/53; 355/73; 355/75

[58] Field of Search ............... 355/39, 40, 77, 75, 355/63, 73, 53, 54, 64, 74, 122, 125, 72; 40/125 R, 341

[56] References Cited

U.S. PATENT DOCUMENTS

| | | | |
|---|---|---|---|
| 1,907,072 | 5/1933 | Jones | 355/122 |
| 2,213,313 | 9/1940 | Hill | 355/72 |
| 2,388,394 | 11/1945 | Drucker | 355/63 |
| 2,490,794 | 12/1949 | Florsheim | 355/72 X |
| 2,597,003 | 5/1952 | Johnson | 40/125 R |
| 2,822,723 | 2/1958 | Grey | 355/72 |
| 2,836,099 | 5/1958 | Weishaupt | 355/73 X |
| 2,881,658 | 4/1959 | Bornemann | 355/54 X |
| 2,933,014 | 4/1960 | Anander | 355/73 X |
| 3,078,775 | 2/1963 | Lee et al. | 355/64 X |
| 3,261,259 | 7/1966 | Baptie et al. | 355/39 |
| 3,436,149 | 4/1969 | Wicker | 355/75 X |
| 3,558,226 | 1/1971 | Riggs et al. | 355/44 |
| 3,627,413 | 12/1971 | Bushey et al. | 355/54 X |
| 3,750,553 | 8/1973 | Pfeifer et al. | 355/40 X |
| 3,910,698 | 10/1975 | Sone et al. | 355/54 X |
| 3,974,582 | 8/1976 | Jantzen | 355/75 X |

FOREIGN PATENT DOCUMENTS

| | | | |
|---|---|---|---|
| 1,180,804 | 1/1959 | France | 355/72 |
| 17,259 | 6/1898 | Switzerland | 355/75 |

Primary Examiner—Donald A. Griffin

[57] ABSTRACT

A step-and-repeat camera wherein the multiple exposure frame format can be varied and preset by the operator. Thus, the number of exposure frames per column and the number of columns per fiche can be varied as desired so as to accommodate the sizes of different sets of materials to be photographed, for example. Means are provided for blanking out specific areas in fiche to accommodate title placement or other identification, spacing between successive sets of materials, and so forth. Visual means are provided for identifying a particular frame about to be exposed, and also for separately identifying successive exposures on the fiche film itself. Other improvements herein include an improved vacuum platen that accurately positions the film for proper exposure at a desirably reduced plan area. Film spool and film take-up cartridges with associated equipment are supplied in improved structural design. The camera carriage itself, by a pair of stepping motors, is advanced so that successive frames in each column and successive columns can be accommodated. Various exposure formats are likewise made possible through the design of the equipment.

5 Claims, 20 Drawing Figures

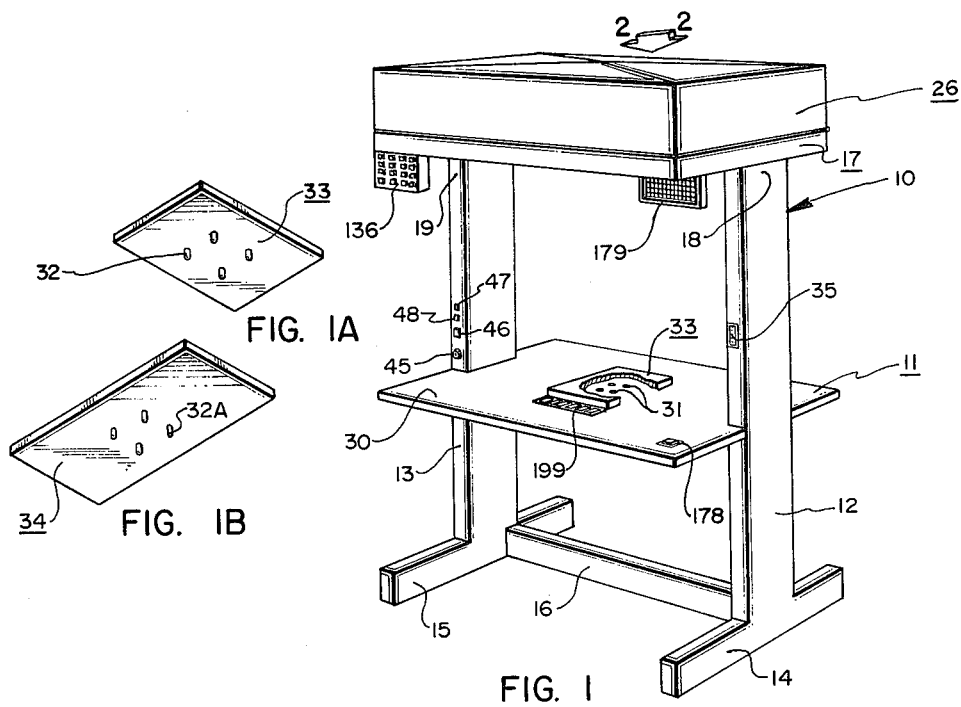
FIG. 1A
FIG. 1B
FIG. 1
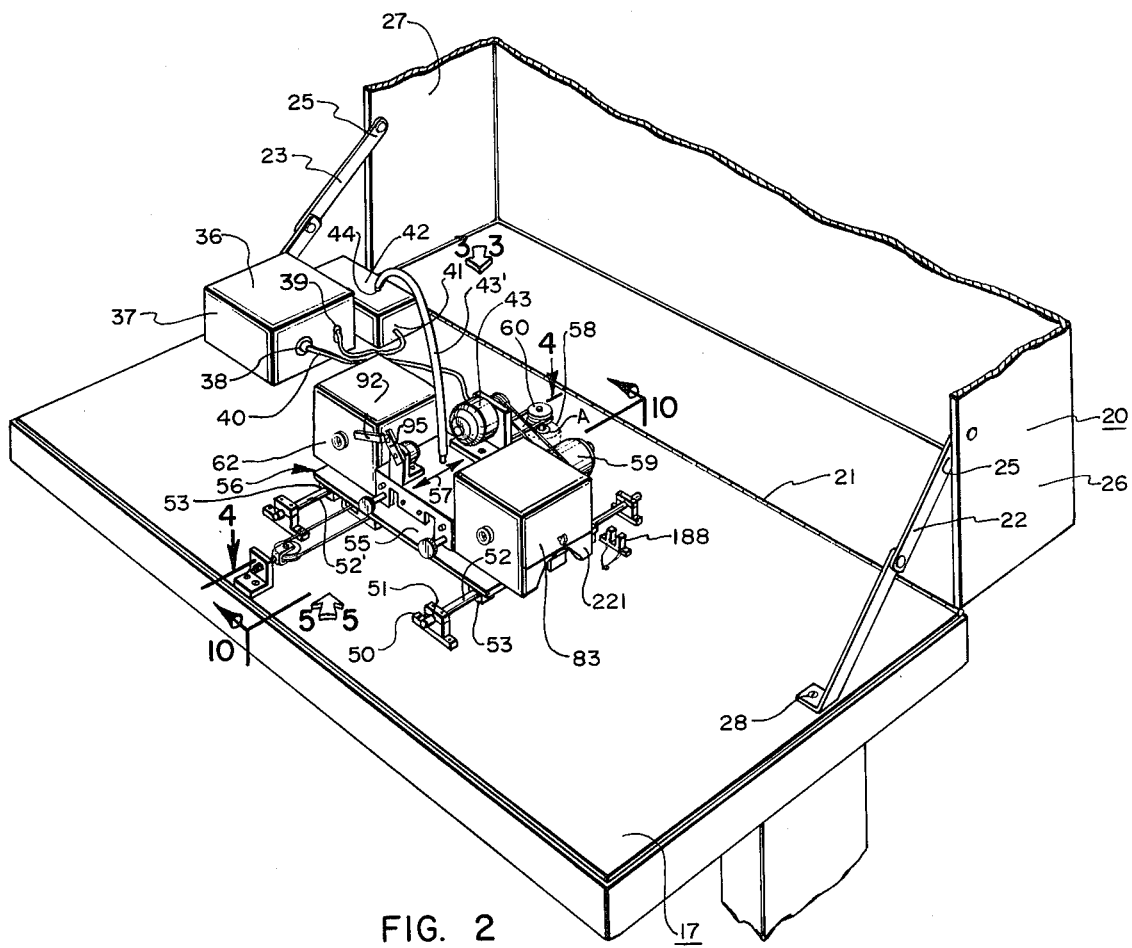
FIG. 2

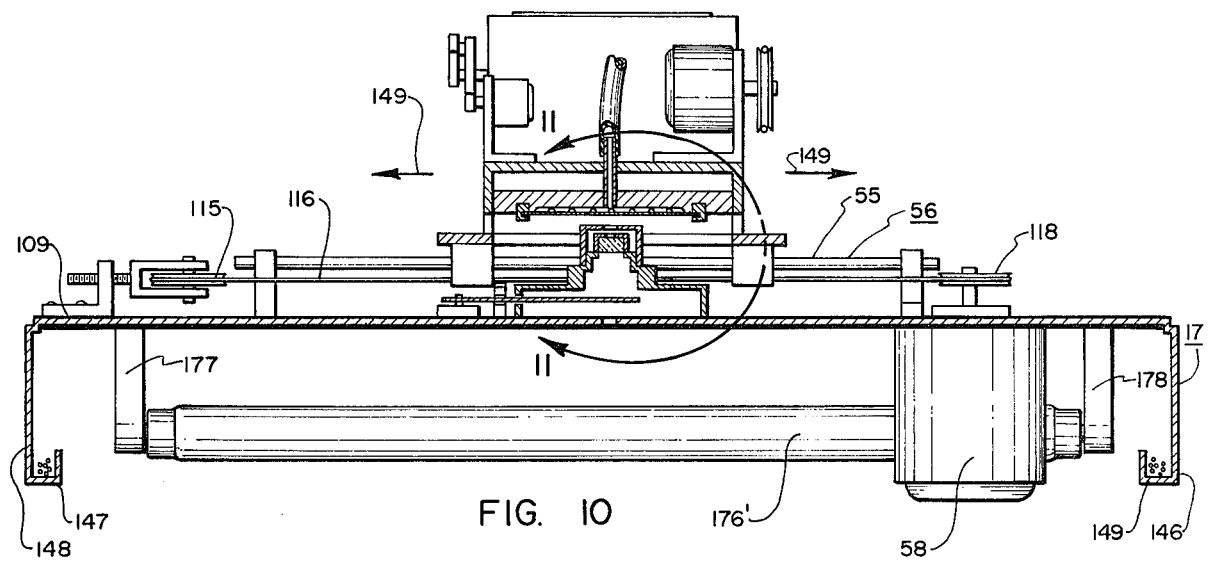
FIG. 10
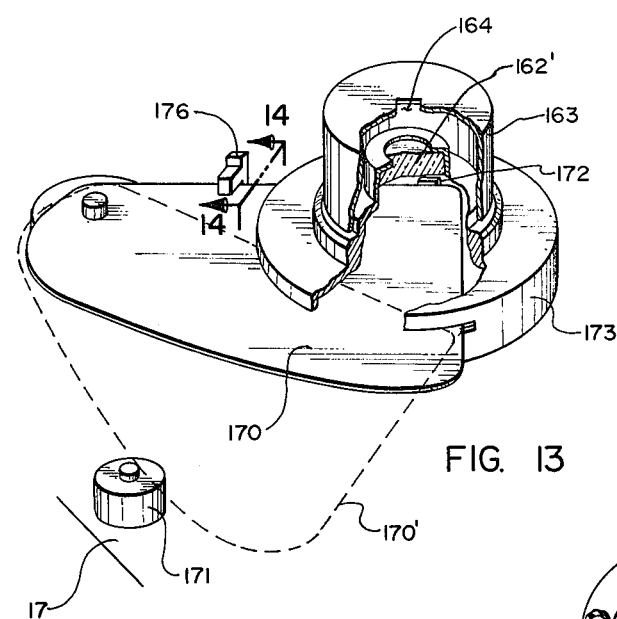
FIG. 13
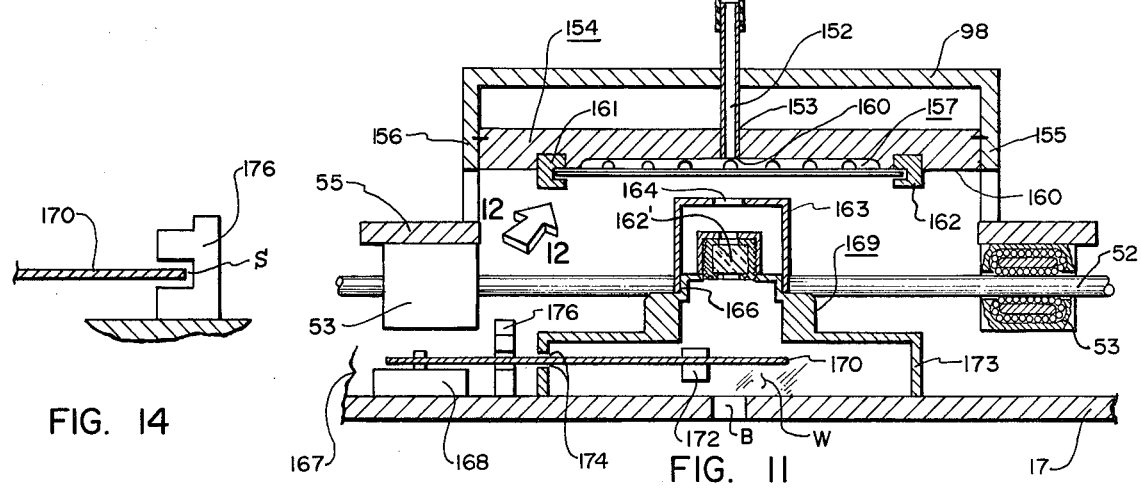
FIG. 14
FIG. 11

STEP-AND-REPEAT CAMERA

FIELD OF INVENTION

The present invention relates to step-and-repeat cameras and, more particularly, to cameras which can be preset and equipped to accommodate any one of a number of exposure formats.

BACKGROUND OF THE INVENTION

In the past many types of step-and-repeat cameras have been developed. See, for example, the following U.S. patents:

U.S. Pat. Nos. 3,343,565; 3,682,546; 3,910,698; 3,502,411; 3,627,413; Re.28,046; 3,680,461; 3,972,610; 3,848,134; 3,796,489.

U.S. Pat. No. 3,433,565 teaches recording a series of successive images on 35 millimeter film and thereafter incrementally stepping the film a given distance to begin a second row of images. U.S. Pat. No. 3,502,411 teaches a series of exposures on successive rows on a wide film for an optical step printer. Pat. No. 3,682,546 includes fiche coordinate counting means operated each time the camera shutter is operated. U.S. Pat. No. 3,972,610 teaches a certain process for producing plural images on a sheet. A certain type of fiche-coordinate counting means for counting frames is taught in U.S. Pat. No. 3,682,546. U.S. Pat. No. 3,627,413 teaches the bare concept, standing alone, of a movable carriage designed to pass a film laterally across a lens position, additional means being provided for advancing the film in a longitudinal direction. Various drives and registration means relative to exposure apparatus, and certain film positioning means are illustrated in the following six patents: U.S. Pat. Nos. 3,796,489, 3,848,134, 3,910,698, Re. 28,046, 3,680,461, and 3,502,411.

Riggs U.S. Pat. No. 3,558,226 does illustrate variation in format, but only where a master microfiche is made up of a series of vertically spaced horizontal strips inserted in a jacket the frames on each strip being adjustable as to number, different numbers of rows, and so forth. None of the above patents teach singly or in combination the provision of multiple-format capability on a step-and-repeat camera designed to produce automatically a michrofiche master as to the wide film of bidirectional movement and used by the subject camera.

In known structure, step-and-repeat cameras have taken the form generally of fixed exposure formats, offering capability only of a fixed number of frames per column and a fixed number of columns, with fixed columns spacing and frame exposure. This is often undesirable since, at time, and because of varying sizes of sets of materials to be exposed, it may be desired to have a greater number of frame per column, which frames can be "read," as to the microfiche produced, by the same power lens. Likewise, it may be desirable to include several columns on a single fiche so that not merely 98 frames can be imposed thereon on an 7 $\times$ 14 format, but many more frames, particularly where the size of the sheets of the materials to be reproduced is smaller than usual.

BRIEF DESCRIPTION OF THE INVENTION

In accordance with the principles of the present invention, a step-and-repeat camera incorporates a pair of stepping motors, one for discretely advancing the film and the other for moving the exposure carriage in a direction transverse to the film advance. Electrical means are provided to preset and to selectively vary the spacing between the tops of the exposed frames in a single column as well as an edge beginnings of adjacent columns. Thus, there is flexibility provided in the equipment such that the columns can be effectively spaced as desired so as to provide either a greater number or a lesser number of columns on a single 4 $\times$ 6 fiche. Additionally, the number of frames per column for a given dimension can be varied as desired. A registered copyboard is included on the table of the camera such that it can be reoriented for legal or standard paper sizes, for example. The surrounding surface of the table is preferably a dark color such as a dull black, whereas the copyboard itself is preferably white. There may be disposed on the table proximate the copyboard a luminous indicating means which will step automatically a given number of digits such that the exposures will carry desired numeral or other identification.

A matrix indicator is also provided so that a particular exposure frame, regardless of the format selected, will illuminate the frame position in the fiche which shall be next exposed.

Means are provided for indexing successive exposures and for changing at will a particular format. Means are likewise provided for blanking out a given portion of a fiche exposure so as to separate successive sets of exposures of different sets of materials and also to provide for title identification, and so forth. A vacuum platen and other means are provided for advantageous operation of the camera structure as hereinafter pointed out.

OBJECTS

A principal object of the present invention is to provide a new and improved step-and-repeat camera.

A further object is to provide a programmable step-and-repeat camera which can facilitate any one of a number of formats.

A further object is to provide a camera of the type described wherein automatic index markings will be automatically recorded on each frame exposure.

A further object is to provide a presettable control means for a step-and-repeat camera that can be used to preselect column and/or frame spacing, successive frame progression formats, and otherwise be useful to accommodate sets of materials of differing sizes.

A further object is to provide a next-frame exposure indicator, informing the operator as to that particular point or area of the film which is to be next exposed.

A further object is to provide stepping motors to accomplish lateral and longitudinal displacement over a lens position, so as to provide a desired exposure pattern on a wide-film supply, and this with column and frame spacing being variable and selectible.

A further object is to provide programmable means for blanking from exposure, certain portions of michrofiche master film.

An additional object is to provide for a materials' support table and associated structure which will facilitate fast filming of materials.

The features of the present invention which are believed to be novel are set forth with particularly in the appended claims. The present invention, both as to its organization and manner of operation, together with further objects and advantages thereof, may best be understood by reference to the following description, taken in connection with the accompanying drawings in which:

BRIEF DESCRIPTION OF THE DRAWINGS

FIG. 1 is a perspective view, partially broken away and sectioned, of a step-and-repeat camera constructed in accordance with the principles of the present invention.

FIG. 1A is a bottom perspective view of a first copyboard used in conjunction with the table of the camera of FIG. 1.

FIG. 1B is a bottom perspective view of an alternate copyboard usable with the table of the structure of FIG. 1.

FIG. 2 is an enlarged perspective view taken along the arrows 2—2 in FIG. 1 when the cover is open to reveal the carriage, power supply, and other operative equipment of the camera of FIG. 1.

FIG. 10 is an enlarged vertical section taken along the line 10—10 in FIG. 2, illustrating a completion of the structure at the central area of FIG. 2 wherein the camera structure is positioned to take successive exposures.

FIG. 11 is an enlarged detail principally in section and taken along the arcuate line 11—11 in FIG. 10, this to show the vacuum platen structure of the camera with the lens, shutter mechanism, and additional structure.

FIG. 13 is an enlarged perspective view of the shutter and lens mechanism, the dotted line therein indicating withdrawal of the shutter so as to expose film disposed above the lens.

FIG. 14 is a fragmentary view, principally in section and taken along the line 14—14 in FIG. 13, illustrating the manner in which a photo beam is selectively interrupted by the shutter of the camera structure.

DETAILED DESCRIPTION OF PREFERRED EMBODIMENTS

Figure 3:
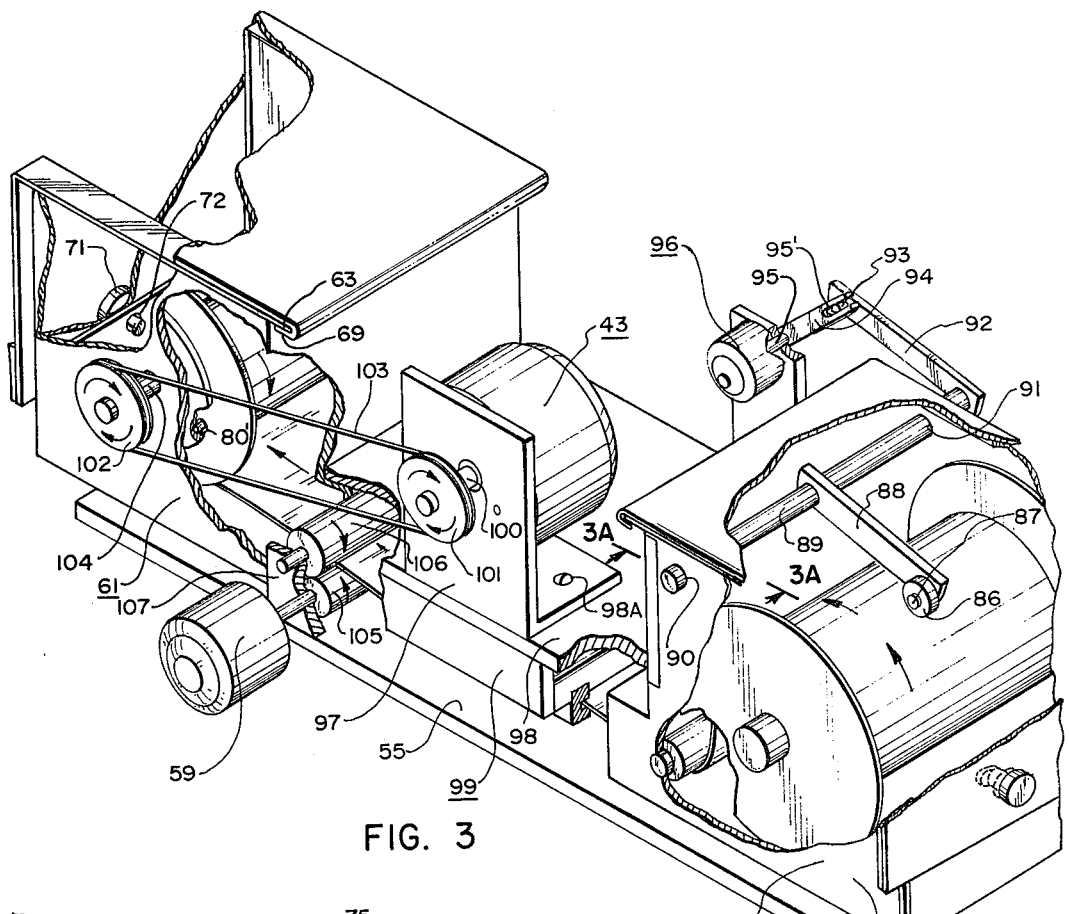
FIG. 3 is a fragmentary perspective view taken along the arrow 3—3 in FIG. 2 and is shown in enlarged view.

In FIG. 1 microfiche step-and-repeat camera structure 10 includes a horizontal table 11 affixed to and supported by opposite side vertical standards 12 and 13. The standards include feet 14 and 15, respectively, which are shown connected by crossbar 16. Deck 17 is affixed to and supported by the opposite ends 18 and 19 of standards 12 and 13 in any conventional manner. A cover 20 is provided with a piano hinge connection 21 which secures the cover to the deck 17. Hinge braces 22 and 23 are pivotly secured at their ends 24 and 25 to the opposite sides 26 and 27 of cover 20. The opposite ends of the hinge braces are secured by screws or other attachments at 28, for example, to the top of deck 17. Table 11 has an upper surface 30 having a dull black or other darkened finish. The table is provided with a series of registration holes 31 for accommodating the several positioning pins 32 and 32A of a copy board plate. A copy board plate which, for example, may be either letter size as at plate 33 or a legal size as at plate 34 in FIG. 1B is preferably white or some other light color. The positioning pins 32, 32A, whatever size the copy board, are dimensioned for registration and positioning in the registration holes 31 of table 11. It is noted relative to FIGS. 1A and 1B that the copy boards may be independently selected and positioned so that their longitudinal dimension is either aligned with or normal to the longitudinal dimension of table 11. Accordingly, the subject camera structure may accommodate various sizes of copy to be photographed.

Vertical standard 12 may have mounted thereon a film supply indicator 35. Such indicator may be an edge-reading meter and take one of several forms.

There are several types of edge reading meters on the market, of course, and one type that can be used here is the Emico Model 13 Edge Reading Meter, Catalog No. 2435. Such is manufactured by the Electro-Mechanical Instruments Company of Perkasie, Pa. The scale selected, of course, would have to read "feet" or other length units other than voltages, currents, and so forth. Other manufactures of edge reading meters are Modutec, Shurite, and so forth.

Deck 17 includes a cover 36 for electrical equipment contained at 37 within the cover. Such electrical equipment will include a power transformer, a ballast for fluorescent lighting, one or more suitable 110 volt buses, and so forth. The buses will supply electrical connection for plugs 38 and 39 of the electrical leads 40 and 41 which will be connected to and supply voltage for vacuum pump 42 and film-tension motor 43. One type of vacuum pump that can be employed is the Pennplax, made in West Germany, Part No. 202S. The connections will of course be arranged such that the line 43 constitutes a vacuum-line or conduit. Accordingly, a simple aquarium type pump can be employed, with the connections reversed to provide a vacuum in conduit 43' affixed thereto at connection 44.

The left standard 13, see FIG. 1, is provided with a main power switch 45, with fuse holder 46 and a pair of single pole, double throw switches 47 and 48; the former switch comprises a frame skip switch and the latter a column skip switch. These are momentary-contact, push botton switches.

Referring to FIG. 2, it is seen that a set of four brackets 50 are each apertured at 51 to receive one of the two case-hardened rods 52 and 52'. These rods are, of course, in mutual juxtaposition. Disposed upon such rods are the four linear bearings 53, two of which are shown in FIG. 2. These bearings are affixed to carriage base 55 and supply a slide-type journal support for the carriage base 55 relative to the rods. Thus, the carriage 56 is free to slide back and forth in accordance with the position of the double arrow 57 in FIG. 2, under control of the frame stepping motor as shall be hereinafter described. The four linear bearings 53, two mounted to opposite sides of carriage base 55, may comprise Thompson or Barden bearings such as Thompson bearing A-61014, ⅜ inch nominal shaft diameter. See Form 1371/75 of Thompsoon Industries Inc., Manhasset, N.Y.

Each of the rods 52 may comprise case-hardened steel rods, with bearings, known as a Class S shaft, ⅜ inch diameter being used. Kindly note table R, "Solid 60" case-hardened and ground shafts of the same publication.

Carriage movement stepping motor 58 is fixedly mounted to the underside of deck 17 by any conventional means. The shaft of such motor will proceed through a suitable aperture A of the deck to be upstanding therefrom and receive pulley 60. The carriage movement motor may comprise a SLO-SYN synchronous stepping motor, model No. MO 91-FC03, made by the Superior Electric Company of Bristol, Conn. The remaining two motors, the film-tension motor 43 and the film advance stepping motor 59, are carried by carriage 56. Film advance stepping motor 59 may likewise comprise a SLO-SYN synchronous stepping motor, Model No. MO61-SCO2, likewise manufactured by the Superior Electric Company of Bristol, Conn.

The film-tension motor may comprise a torque motor 43, see motor KC11-26, Model No. 621BJ901, manufactured by the Bodine Company of Chicago, Ill.

Figure 6A:
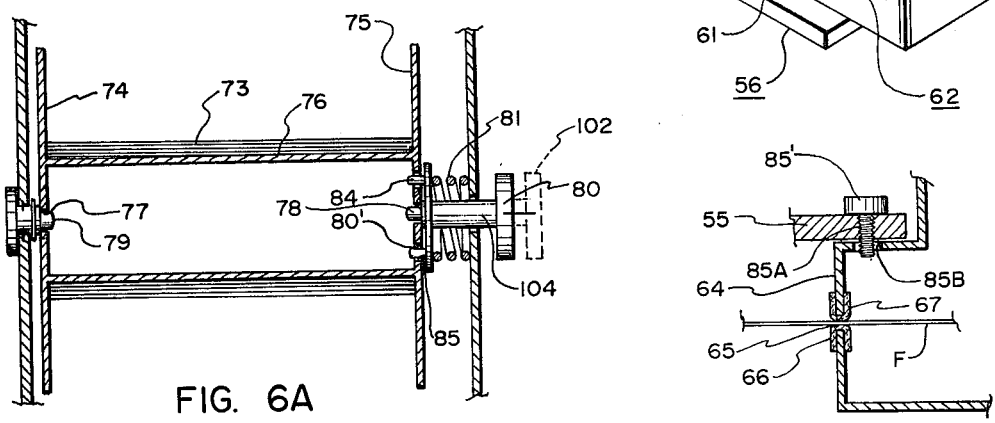
FIG. 6A is a vertical cross-section taken along the line 6A—6A in FIG. 6, illustrating the construction when a take-up spool is installed therein.
Figure 3A:
FIG. 3A is an enlarged detail, principally in section, and taken along the line 3A—3A in FIG. 3.
Figure 6:
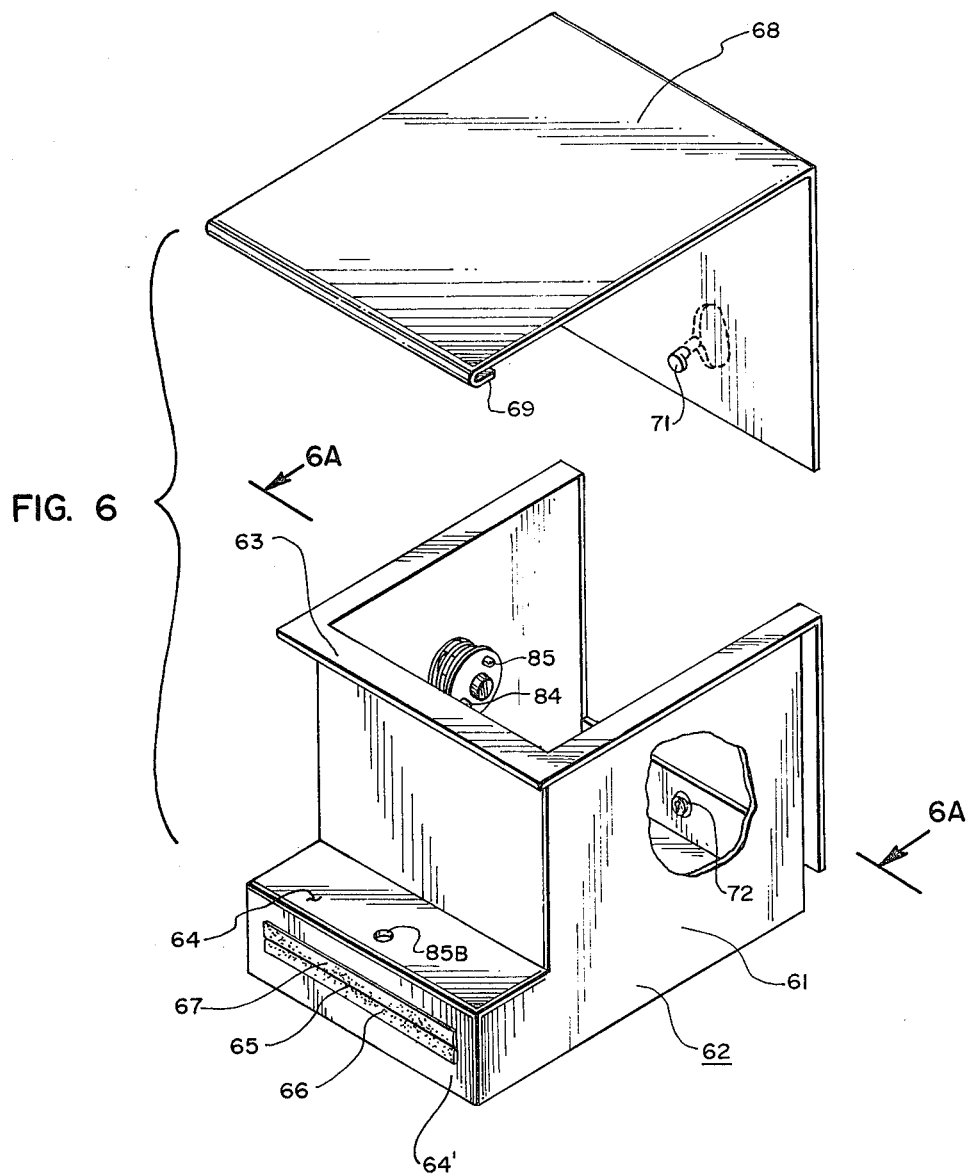
FIG. 6 is an exploded perspective view of the take-up film cartridge of FIG. 2; the film spool cartridge or supply cartridge will be essentially the same as that shown in FIG. 6 as well.

In FIGS. 3 and 6, a perspective view of the film take-up cartridge or cannister 62 is indicated. While the same may take several forms, the form shown is preferred. It is seen that housing 61 of the film supply cannister 62 includes a forwardly extending lip 63 and also a forwardly extending portion 64 provided with slot 65. A black felt or other type of pad 66 is glued to the opposite surfaces of face 64', of portion 64. The pads at 66 and 67, of U-shaped cross-section as shown in FIG. 3A, simply serve as a liner for the film slot aperture 65 both to keep out light and to reduce friction on opposite surfaces of the film F. The cover 68 of FIG. 6 is L-configured and includes a doubled-back edge 69 that encompasses forward flange 63 when closure is made. A standard, pivotally movable fastener 71 fits into a conventional closure, locking aperture construction 72 in a conventional manner and releasably locks to the same.

The film roll 73 will of course have a pair of end flanges 74 and 75 as to its spool 76, both flanges being provided with end apertures 77 and 78. These will register with a bronze or brass spool retainer 79 that is provided the film housing for the cannister and also to the spring-loaded button 80 of manually adjustable character, the same being provided with compression spring 81. The film roll mount will be the same for both the film's supply cartridge 62 and film take-up cartridge 83, save in connection with the latter there will be provided a pair of pins 84 and 85 which engage the side aperture 80' of the spool in a locking engagement relationship, this for turning the take-up spool.

For both of the cartridges or magazines 62 and 83, there will be provided a pin connection at 85 which threads into threaded aperture 85A of carriage-base 55 and protrudes into aperture 85B of the forward portion 64 of each film housing or cannister.

In connection with the film supply cartridge or magazine 62 in FIG. 3, it is seen that there is a film supply sensing roller 86 that is pivoted or journaled at 87 to sensor arm 88. The latter is fixed onto shaft 89, the same being pivoted in aligned apertures 90 and 91 and connecting rigidly to arm 92. Arm 92 includes an inwardly extending pin 93 that is disposed in slot 95' of bifurcated arm 94. Arm 94 is affixed to and radially extends outwardly from the end of shaft 95 of the variable resistor 96. The purpose for this shall be described hereinafter. At this point it is noted that as the arm 92 rotationally displaces with and about the axis of shaft 89, and that, therefore, there will be a movement of shaft 95 and hence a variation in the resistance of variable resistor 96, the purpose for which shall be later set forth.

In returning to FIG. 3, it is seen that motor 43 is mounted to a bracket 97 that is secured by suitable attachment means 98A. Bracket 97 is securely attached to plate 98 which in turn is attached to structure 99 and carriage base 55. All of this attachment may be accomplished by screws or by other suitable means. All of this structure can be one large casting, if desired. In any event, shaft 100 of motor 43 is provided with a pulley 101 which is coupled to pulley 102 by a neoprene or other type of O-ring or belt 103. Pulley 102 is keyed to or simply forms knob 80 of FIG. 6A, and in any event revolves shank 104 and pins 80' for turning the film take-up spool 73 and hence tensioning the film on the spool. Motor 59 is keyed to the lower roller 105 and advances film friction rollers 105 and 106, journaled to carriage structure 107, for "column advance".

The operation of the motor 43 thus produces a revolvement of shank 104 and hence a tension take-up of the film as it is advanced by motor 59.

Figure 7:
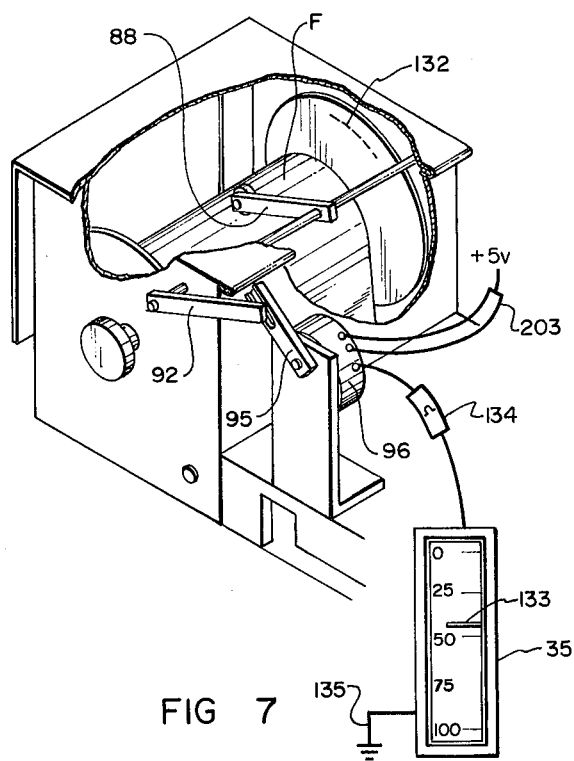
FIG. 7 illustrates the film supply cartridge wherein a portion of the film has been exposed the meter indicator of the camera indicating the remaining film to be exposed.

In FIG. 7 the film F at the beginning will be disposed at a point proximate dotted line 132. As the film is gradually unwound, then, when the film spool is about 60% empty, i.e. when less than half remains, see the indicator 133, then the meter at 35 will so read and give an indication as to the footage remaining to be exposed. This is effected by automatic rotative adjustment, by arms 92, 94 and shaft 95 of the variable resistor 96 in FIGS. 3, 7, and 8. Variable resistor 96 is coupled to a 5-volt potential source and employs current-limiting resistor 134 in the circuit connection to meter 35, the latter of course being grounded in the usual way at 135.

Figure 8:
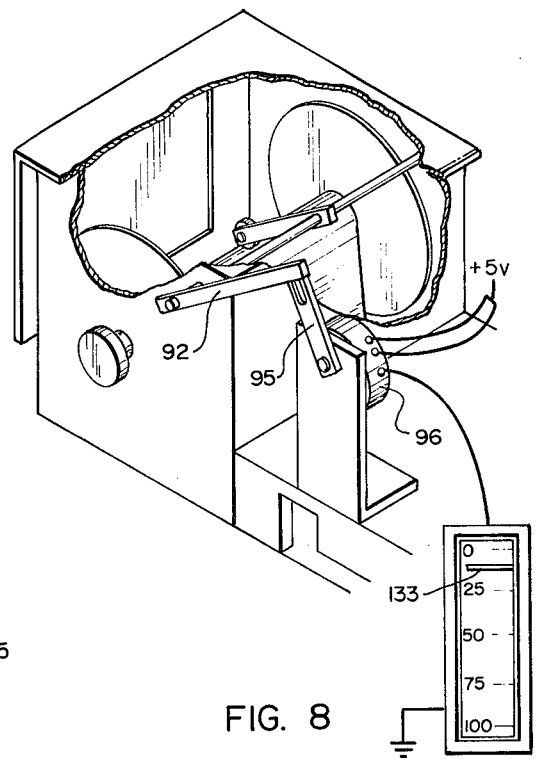
FIG. 8 is similar to FIG. 7 but illustrates the sensing device therein as being reoriented to correspond to the reduced film supply, wherein the film meter indicates the remaining supply to be of small quantity.

FIG. 7 illustrates the condition wherein the film roll has been partially used, the indicator showing the extent of use, and FIG. 8 illustrates that the film spool is nearly empty.

Figure 9:
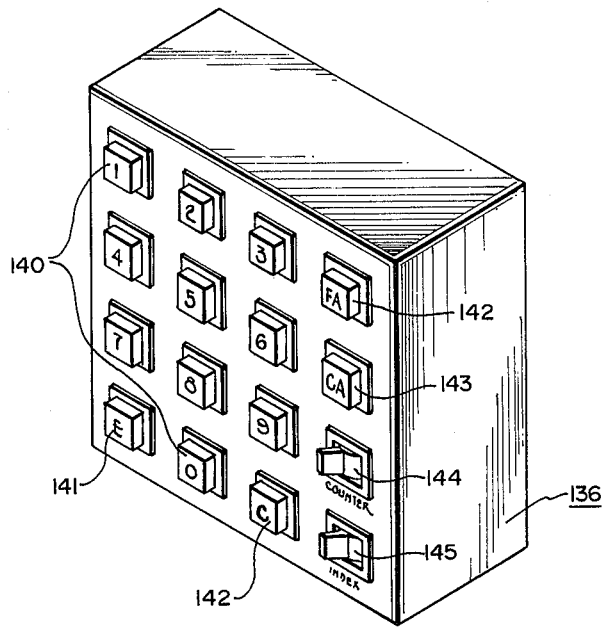
FIG. 9 is a perspective view of a control box or panel associated with the structure of FIG. 1 and is shown in enlarged form.

The numeral 136 designates a control box or control panel as shown in FIGS. 1 and 9. Such a control panel includes spring-loaded push buttons numbered 1-9, 0 as is shown by the button series 140 in FIG. 9.

There are additional buttons E and C, referring to "enter" and "clear" momentary-contact push-button switches.

The buttons FA and CA are momentary contact push button switches for "frame advance" and "column advance", respectively. These switches are functionally in parallel with "frame advance" and "column advance"

switches 47 and 48 in FIG. 1. This will be described hereinafter. Counter and index switches 144 and 145 are shown. Switches 144 and 145 are or may be paddle switches of the double-throw, multi-pole type.

The FIG. 9 structure will be described in connection with the electrical schematic hereinafter set forth.

In FIG. 10 platform 17 includes depending members 146 and 147 which may be useful in supporting and mounting electrical leads 148 and 149. It is seen in FIG. 10 that the motor 58 drives pulley 18 so as to move the carriage 56 and its platform 55 back and forth in a series of steps in the direction of the arrows 149. Accordingly, motor movement of the cable 116 with respect to its pulleys 115 and 118 operates to move the cable back and forth and serving to produce a frame-stepping movement for a particular column at any given time.

FIG. 11, being an enlarged view of a central portion of FIG. 10, illustrates the vacuum platen structure utilized with the film guide assembly. See also FIG. 5. Pump 42 is a vacuum pump as before explained and includes the vacuum line 43' leading to tube 152, fixed in aperture 153 of platen 154. Platen 154 is secured to the plate or cover 98. This securement is accomplished at the side flanges 155 and 156 thereof. Platform 55 is also shown, see FIG. 2, and the flanges 155 extend downwardly to be fixed to or otherwise made integral with platform 55, the latter of which carries the bearings 53 as hereinbefore explained.

Figure 12:
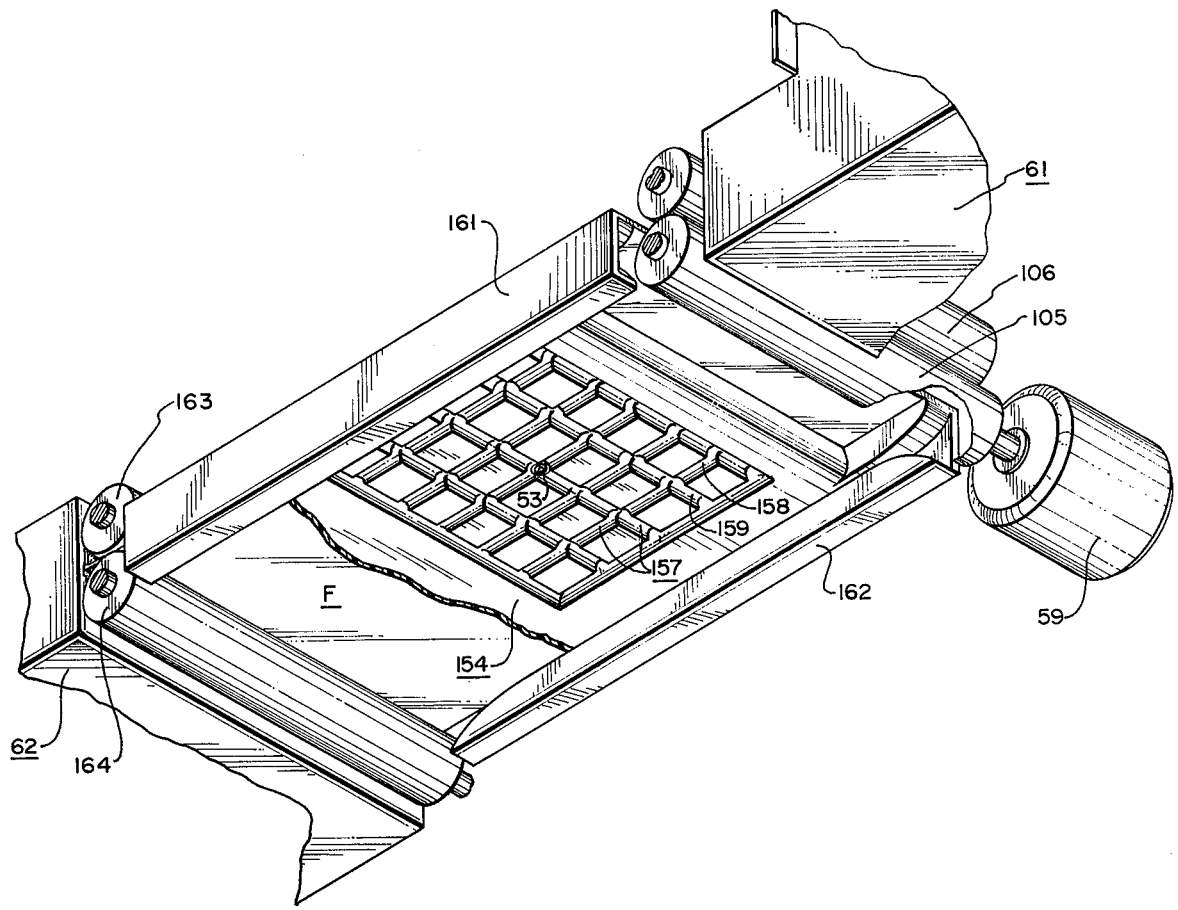
FIG. 12 is a perspective view illustrating the vacuum platen structure with the film edge guides and associated rollers accommodating the film supply and film take-up cartridges.

Platen 154 has a groove-grid 157 enlarged in FIG. 12, i.e. a series of intersecting grooves 158 and 159. Such grooves provide communication with the end 160 of vacuum tube 152. The film guides 161 and 162 are disposed on opposite sides of and receive the opposite edges of the film. These film guides extend to friction rollers 163, 164 and 105, 106 which receive them proximate the interior surfaces of the two cartridges.

It is noted that the grid of the groove structure terminates short of the edges of the film and the film guides, thereby assuring that a vacuum persists over the platen dimension so as to retain the film upwardly against the under surface 160 of the platen.

The lens and shutter assembly is shown at 169, FIG. 11, and includes the usual lens 162' having an externally threaded, adjustable barrel. The lens structure is provided with a cover at 163 having, generally, a rectangular aperture 164. This cover 162 may be replaced by other covers having different sized apertures 164 to accommodate various document sizes. The cover 163 is shown slide-mounted over upstanding boss portion 166 and can simply be rotated thereon for adjustment purposes. The shutter assembly 167 includes an electrical component 168, which is in fact an electrical solenoid of the rotary type. A suitable solenoid is a "Ledex", solenoid, Catalog C-1000, the Ledex Company, Dayton, Ohio. A suitable part has the identification H-1079-037. The shutter 170 is also shown in FIG. 13 in both the dotted-line configuration at 179 and also in the solid-line configuration shown. The shutter is shown closed in FIG. 12, see its solid-line configuration, so as to preclude any exposure of film. A rubber bumper 171 provides a resilient limit stop to preclude unwanted vibration and damage to the shutter, as well as be effective for noise reduction. This rubber bumper 171 is mounted simply to the bed 17; the pad 172, which can be also a resilient stop pad, is mounted on a wall W of shutter housing base 173. A slot 174 is provided in such base and accommodates the rotationally displaceable movement of shutter run 70. Optical limit switch 176 may be a Monsanto slotted optical limit switch, Part No. MCA8, manufactured by the Monsanto Company of Palo Alto, Calif., see the company's 1975 catalog.

The shutter is closed, to avoid light communication to the film, in FIG. 13. At such point the shutter is disposed in the slot S of the optical shutter switch 176 so that there is an interruption of light communication therethrough.

When the solenoid 168 is energized then the shutter proceeds to the dotted line condition shown at 170' in FIG. 13, at which point there is light communication through the switch so as to "close" the same, completing a grounding circuit and preparing the optical limit switch for subsequent closure of the shutter, at which point the optical limit switch serves to initiate carriage movement as shall be hereinafter described.

To illuminate materials below, for successive exposure, there may be supplied, see FIG. 10, one or more flourescent lights, the same being supported and supplied electrical connection by the usual depending bosses 177 and 178, see FIG. 10. The lights may derive electrical power by the power supply structure equipment at 36 in FIG. 2 and one is shown at 176'.

Figures 15, 15A:
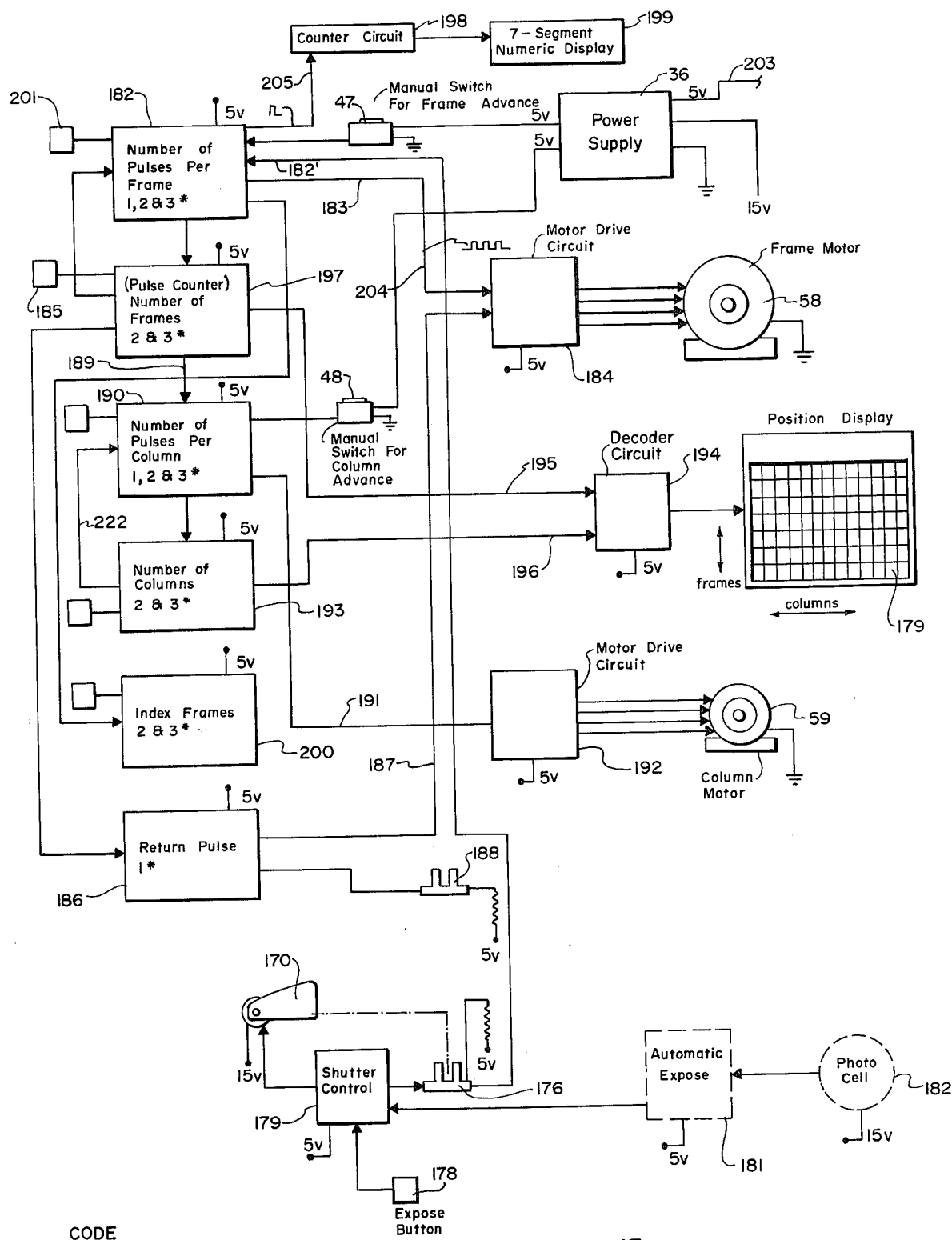
FIGS. 15 and 15A are an electrical schematic and code, respectively, showing the electrical system utilized herein.

FIG. 15 illustrates the operation of the equipment and the circuitry thereof. General layout will be discussed in connection with such operation. At the outside, it is noted that a position display box or panel 179 is positioned on the equipment as shown in FIG. 1, for example, and is constructed such that successive depressions of push button 178 will actuate the shutter control circuity 179 so as to actuate shutter 170, moving the same to the dotted line position shown at 170' in FIG. 13. The shutter control circuity is conventional. The shutter control 179 comprises an integrated circuit which is a dual, one-shot multivibrator, the standard type 74221. Such circuits are standard in use for electrically-actuated shutters and cameras and comprises basically a timer circuit. It will be understood that the "Automatic Expose" element 181 and photocell 182 will form a part of or will be integrally related with the shutter control 179. After an exposure, then, as the shutter 170 returns to its solid-line position shown in FIG. 13, it will interrupt the light in the optical limit switch 176 so as to commence a cycle. Thus, when the shutter interrupts the beam at 176, an open-circuit high impedance is sensed at stage 182, which initiates the functions described, i.e. beginning a pulse train, a pulse counter, and comparing the pulses generated to a preset number. All of the stages 182, 197, 190, 193, 200 and 186 will comprise integrated circuits such as the Fairchild $\mu$A2240, known as a "Programmable timer-counter," the same utilizing TTL logic and having, accordingly, usually associated gates and timer circuits. At 182 the pulse train generated is carried by lead 204 to motor drive circuit 184, four leads from which are coupled to frame motor 58. At the time of the last pulse of the pulse train generated at lead 204, a pulse is carried by lead 205 to counter circuit 198 which actuates the seven-segment numeric display 199 shown in FIG. 1. The counter circuit 198 may comprise a known calculator circuit which will be later described.

Reverting back to a consideration of the camera cycle, it will be seen that this cycle consists of cyclic-operation which includes a carriage movement to the next exposure frame or lens position for a particular column. Let it be assumed that we are going down a column from frame to frame. Thus, what is needed to be discretely actuated is the frame advance motor 58 in FIGS.

10 and 15. According to the circuity of FIG. 15, upon reclosure of the shutter and a cutting-off of the light in the switch 176, an open circuit or high-impedance condition is reflected to electronic stage 182. Pulse activation of stage 182 sets up a series of pulses in lead 183 which is fed to motor drive circuit 184. This series of pulses is converted by circuit 184 into a binary code routed to the frame motor 58 for changing the angular disposition of its rotor. Such change results in an equidistant lateral movement of the carriage for successive frame positions as to the camera lens. It is preferred that such incremental steps be accomplished in FIG. 2 in a direction toward the cover, so that each succeeding frame will be vertical and below the next preceeding frame exposed.

It is to be noted that the same operation likewise occurs for subsequent depressions of exposure button 178, until the carriage gets to the bottom of the single column, indicating, of course, that all of the frames in that column have been exposed. Immediately upon exposure of the last frame in a particular column, there automatically occurs a series of return pulses at stage 186 which operates to return the camera carriage back to its initial row position. Such a function is accompanied by initiation of a series of pulses generated at stage 190 which operate to advance stepping motor 59 so that the film is advanced an incremental distance, thereby assuring that the camera is ready to go down the next adjacent column.

Specifically, after receipt of a number of pulses, say 7 pulses, pulse counter 197 will serve to generate a pulse carried to circuit 186 which in turn generates a series of pulses and transmits the same by a lead 187 to circuit 184, thereby reversing the direction of movement of frame motor 58 so that the same proceeds to its uppermost position as aforesaid, limited ultimately by optical limit switch 188. The interruption of light at this switch terminates carriage movement by terminating the operation of frame motor 58. Thus the switch 188, when interrupted, goes to its high impedance state, and thereby serves to discontinue the pulse train generated at stage 186, otherwise fed to stage 184.

Finally, let it be assumed that a series of successive frames for each column and a series of columns has been exposed so as to reach the end of the format of a respective fiche.

At this point stage 193, which has counted the total number of columns exposed, will now generate a pulse via lead 222 which causes stage 190 to generate one more series of pulses via lead 191 so as to advance the film via the column motor 59 to the start of the next fiche, thus leaving a cut-space on the film between adjacent fiche on a roll.

Stage 194 comprises a decoder circuit which is comprised of one of two integrated circuits, one being 74154, a common industry type, and the other will be of the type 9334. The number given relates to a four-to-sixteen decoder. The number 9334 is a three bit to eight bit high level decoder.

The position display 179 thus, as coupled by leads 195 and 196 to stages 197 and 193, simply serves to indicate the particular frame position on the matrix or format at which the next exposure will be taken. The position display indicator 179 consists of a series of light-emitting diodes such as the Monsanto series MV 5020, found in the Monsanto Catalog (1975). Depending on the format, there will be, of course, one LED for each frame as to the position display box 179.

Stage 194, again, is simply a decoder that senses the counting condition of stages 197 and 193 for identifying the particular frame to be exposed and for causing the LED to light at that same position.

Switches 47 and 48 may be independent of or comprise switches 142, 143, serving the identical circuit function, and in any event initiate frame advance and column advance, respectively, and this without the shutter opening. It is important to note that whether switch 47 or switch 48 be actuated, there is a movement, either as to frame advance or as to column advance, without the shutter opening. This serves to separate series of exposures corresponding to different sets of documents, or to advance the film to the beginning of the next fiche without further exposure. If desired, there may be a seven-segment numeric display consisting of a series of system of eight digits, for example, such numeric display being disposed at 199 in FIGS. 1 and 15. While this need not be employed, yet it is desirable to do so where the frames are to be successively numbered. It is to be noted that the number identification will actually be photographed on that particular frame of the fiche. Counter circuit 198 will be a conventional calculator circuit and is preferably designed so that the display 199 can count by ones, twos, or by any other desired interval. The counter circuit may also be designed so that it will count down as well as up, should the customer so desire in his indexing of frames. One type of calculator circuit that can be employed for stage 198 is the circuit MM5739 of the MOS integrated circuits, National Semi-Conductor Corporation, Santa Clara, Calf., if the aforementioned calculator circuit is a nine-digit circuit. If a six-digit circuit is to be employed, then the calculator circuit is MM5736. Rather than LED displays, incandescent displays can and probably should preferably be used. Obviously, the greatest illumination possible is desired for photographic purposes.

Finally, each of the stages 182, 197, 190, 193, and 200 has a switch bank connection as at 201. This provides a binary-coded decimal input to each of these stages aforementioned, and a representative switch is the composite rocker dip switch of the Grahill Co., La Grange, Ill., Switch No. 76B08. The example chosen has eight, individually adjustable, on-off manual switches which are single-pole, single throw switches. These switches are employed to set up a binary coded decimal code which "instructs" the stages 182, 197, 190, 193, and 200 what their maximum count condition will be.

Each of the aforementioned stages constitute and accomplish the several functions as illustrated in FIG. 15A, as noted in the individual blocks denoting such stages. Each of the stages, as described and noted, perform the counting function, but their various switches as at 201 "tell" the individual stages how far to count. In this manner, for a particular column, for example, the frame size and the number of frames per column can be preset. Additionally, stage 190 determines the width of each column by its switch means 201, and stage 193 determines the number of columns per fiche. Correspondingly, and reverting back, push-button switch 201 at stage 182 determines the height of the frame whereas the switch unit associated with stage 197 determines the number of exposures per column.

For stage 200, a presetting of its switch indicates a given number of blank spaces on the top row for each fiche, thus providing a space for indexing, title, and so forth, when desired.

Figure 4:
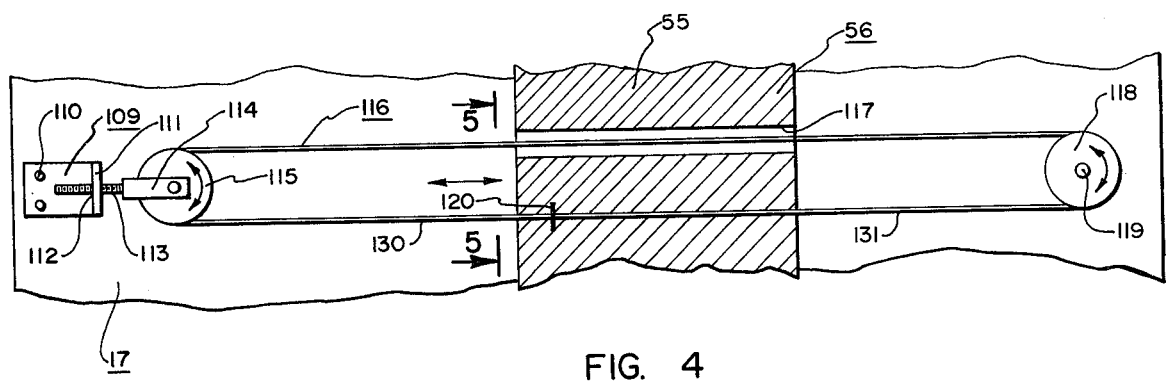
FIG. 4 is an enlarged plan, shown in fragmentary view, of certain carriage transport structure and illustrates schematically the connection of a transport cable to the carriage of the camera equipment.
Figure 5:
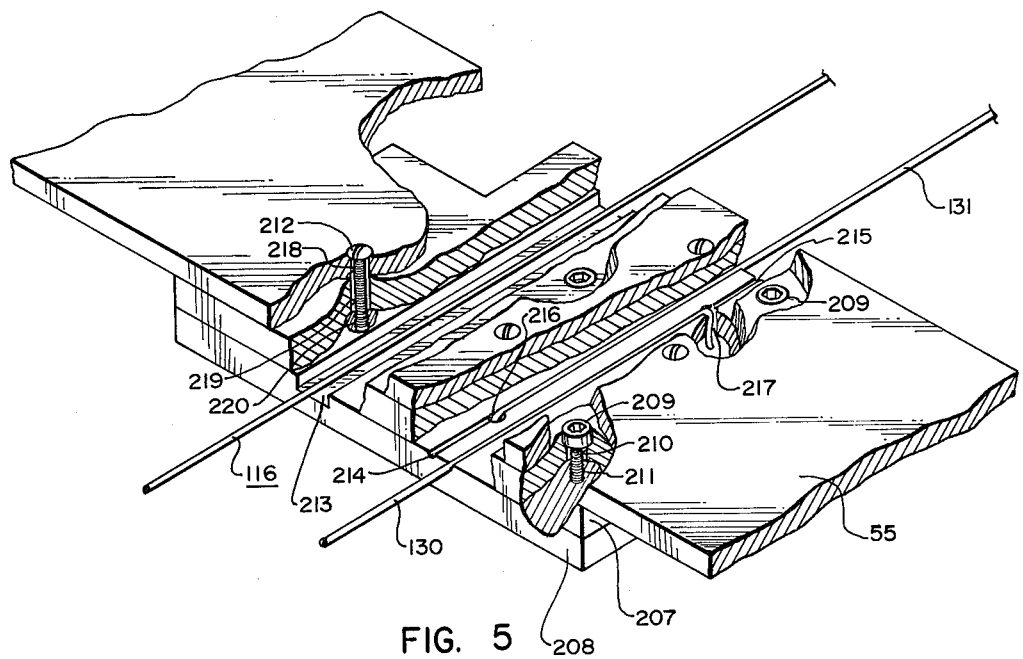
FIG. 5 is an enlarged fragmentary perspective taken along the arrow 5—5 in FIG. 2, illustrating the block structure associated with the carriage which retains the cable in position.

Reverting back to carriage drive relative to camera carriage base 55, there are several types of structures that can be employed. One type is shown in FIGS. 4 and 5, wherein cable 116 loops about pulleys 115 and 118, the former having a clevis mount 114 retained by bracket 109, and the latter having a pivot drive axle in the form of shaft 119 of frame stepping motor 58 of FIG. 2. Bracket 109 is secured to bed 17 by attachments 110 and includes an upstanding flange 111 provided with threaded mounting aperture 112, the latter receiving threaded shank 113 of clevis mount 114. Opposite lengths 130 and 131 are secured at 120 to camera carriage base 55 at 120. Hence, rotational displacement of the shaft 119 of frame stepping motor 58 will move the carriage base and hence carriage 56 so that the film, relative to the stationary camera lens, will move from one frame position to the next.

To effect cable attachment, see FIG. 5, blocks 297 and 208 may be provided and be secured together by screw attachments 209 disposed in registering block apertures 210 and 211. Screws 212 secure both blocks, in their combination, to platform or carriage base 55 by means of apertures 218, 219 and 220. The bottom block 208 is provided with grooves 213, 214, and 215, the first being for cable passage and the latter for positioning and clamping purposes. Apertures 216 and 217 receive the cable ends, for added retention, and the blocks 297 and 298 simply clamp the cable lengths 130, 131 at their ends once screws 209 are tightened. Where shank 113 is pivotally retained by clevis 114, see FIG. 4, then it may be adjusted to adjust the tension at the cable. Note is to be made that the carriage can be disconnected from the cable blocks, by removing screw 212, without disturbing the tension of the cable or its mountings.

Transport of the carriage as above described will ultimately cause carriage finger 221 to advance to and optically operate, through beam operation, optical limit switch 188 of FIGS. 2 and 15 so as to de-actuate state 186 in returning the carriage to "start" position for the next column.

It will be understood that the lens structure and viewing aperture B in bed 17 remain stationary since it is the film that is adjusted in longitudinal and transverse directions for various exposure positions of the camera lens relative to the movable film.

The camera structure herein can be modified to use cut film instead of roll film since, in both cases, the electronics will remain the same for providing variable spacing between fiche rows and columns as well as variable heading and indexing provisions.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

We claim:

1. Photographic structure including, in combination, a table, camera structure spacedly disposed above said table, and a copyboard lock-positioned in a first discrete position on said table in registry with said camera structure and provided with fixed means for enabling upward translational movement of, horizontal 90° rotational displacement of, and downward return of said copyboard to a second, locked, discrete position of said copyboard relative to said table, one of said table and said copyboard having a set of plural protrusions adjacent ones of which are equally spaced, the remainder of said table and copyboard having a set of holes equal in number with and identical in pattern to and positioned to receive all of said protrusions for any position of said copyboard on said table, one of said sets comprising said fixed means.

2. A microfiche step-and-repeat camera, including, in combination, lens means, first means for positioning film in operative disposition with respect to said lens means, second means for shifting such film in a series of steps in a first translational direction relative to said lens means, third means for shifting said film in a series of steps in a second translational direction with respect to said lens means which is transverse to said first direction, fourth means coupled to at least one of said second and third means for selecting step-distance as to film movement in at least one of said directions, and presettable fifth means for automatically controlling exposure frame size.

3. The structure of claim 2 wherein said camera is provided with manual control means coupled to said second and third means for taking successive exposures in matrix form and for automatically actuating said second and third means to effect said shifting.

4. A microfiche step-and-repeat camera, including, in combination, lens means, first means for positioning film in operative disposition with respect to said lens means, second means for shifting each film in a series of steps in a first translational direction relative to said lens means, third means for shifting such film in a series of steps in a second translational direction with respect to said lens means which is transverse to said first direction, fourth means coupled to said second means for presetting one of a number of film-step distances as to said first direction, fifth means coupled to said third means for presetting one of a number of film-step distances as to said second direction, and presettable sixth means for automatically controlling fiche-frame-exposure size.

5. The structure of claim 4 wherein said camera is provided with manual control means coupled to said second and third means for taking successive exposures in matrix form and for automatically actuating said second and third means to effect said shifting.

* * * * *